UNITED STATES PATENT OFFICE.

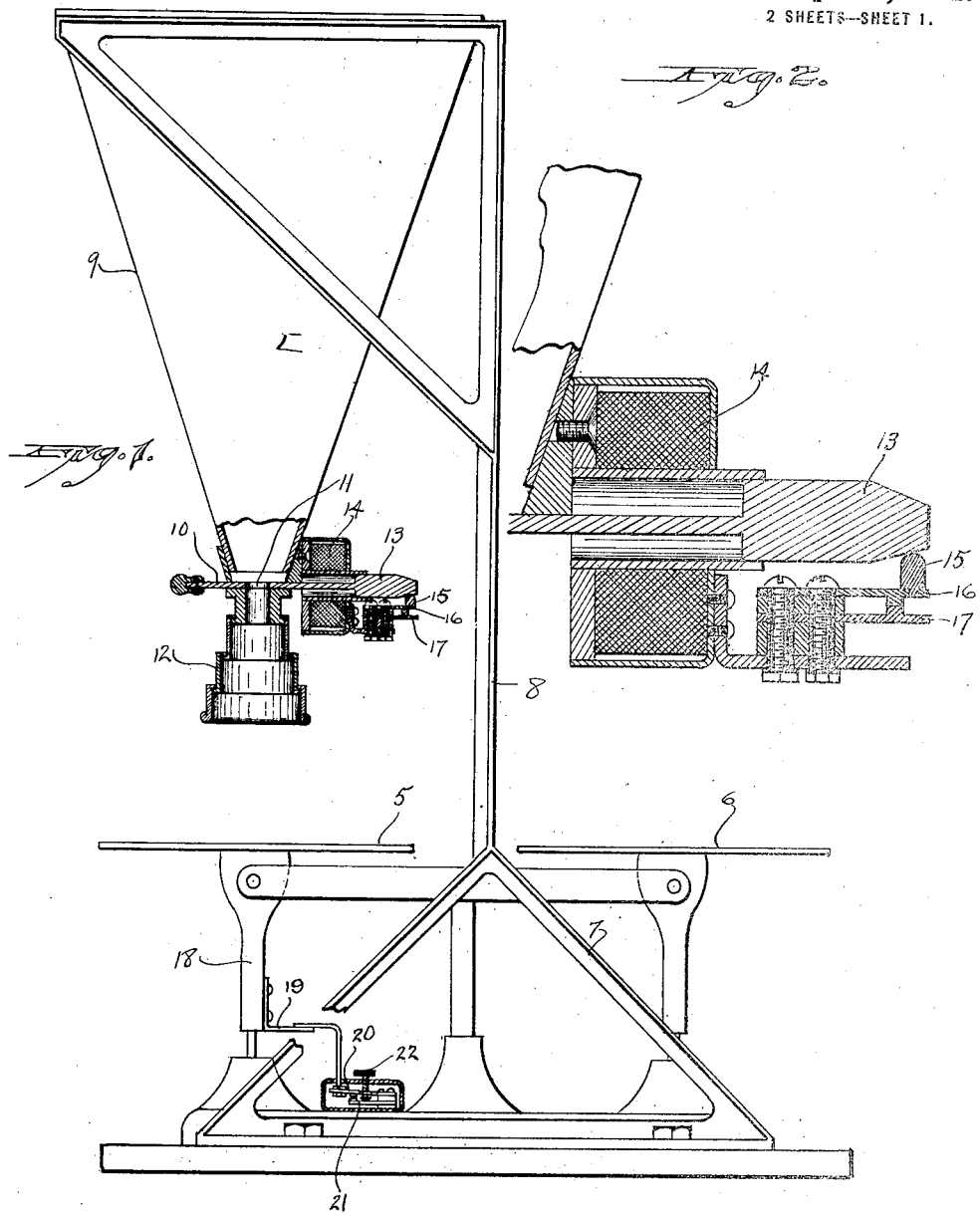

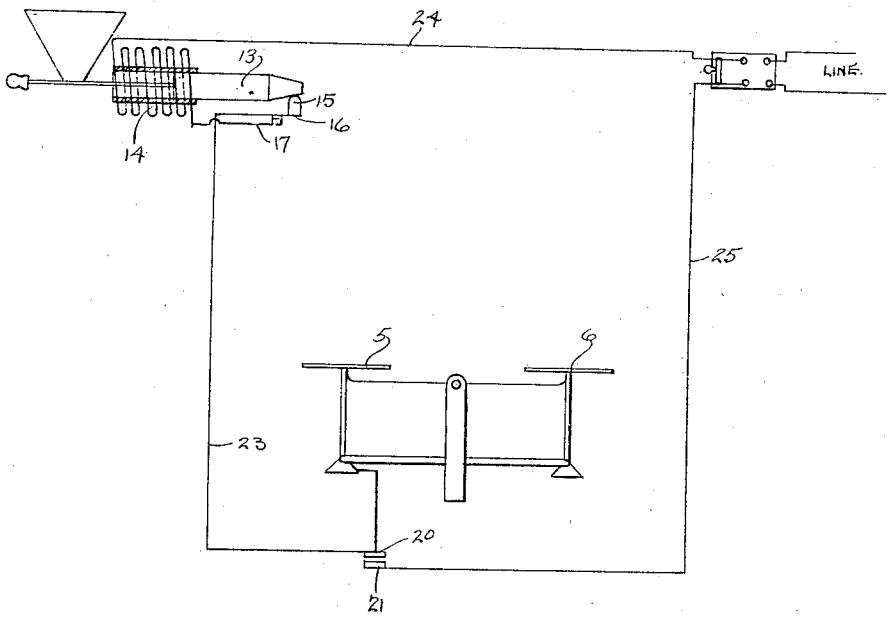

LOUIS J. CURRAN AND GEORGE F. DONNELLY, OF SOUTH MERIDEN, CONNECTICUT.

ELECTRICALLY-CONTROLLED WEIGHING-SCALE.

1,376,138.  Specification of Letters Patent.  Patented Apr. 26, 1921.

Application filed September 18, 1920. Serial No. 411,062.

*To all whom it may concern:*

Be it known that we, LOUIS J. CURRAN and GEORGE F. DONNELLY, citizens of the United States, residing at South Meriden, in the county of New Haven and State of Connecticut, have invented a new and useful Improvement in Electrically-Controlled Weighing-Scales; and we do hereby declare the following, when taken in connection with the accompanying drawings and the characters of reference marked thereon, to be a full, clear, and exact description of the same, and which said drawings constitute part of this application, and represent, in—

Figure 1, a side view, partly in section, of a weighing scale constructed in accordance with our invention;

Fig. 2, a vertical sectional view of the solenoid magnet and armature and contacts closed thereby;

Fig. 3, a diagrammatic view illustrating the electrical circuit.

This invention relates to an improvement in electrically-controlled weighing scales, the object being to provide scales which are automatic in action so that after a predetermined weight of material has been delivered, the supply will be cut off, and the invention consists in the construction and arrangement of parts as hereinafter described and particularly recited in the claims.

In carrying out our invention we employ a scale balance, including the receiving pan 5 and the counterbalancing weight pan 6, suitably mounted in a frame 7 which includes an upright 8 adapted to support a hopper 9 for the reception of material to be weighed. This hopper is closed at its lower end by a slide 10 having a clearance opening 11 to register with the throat of the hopper and form communication between the hopper, and a telescopic delivery tube 12, all arranged over the pan 5. The slide 10 carries at its inner end the armature 13 of a solenoid magnet 14, and the outer end of the armature is preferably tapered so as to readily engage with a button 15 on a movable contact arm 16 adapted to engage, when depressed, with a fixed contact arm 17. The lower end of the stem 18 of the pan 5 is provided with an arm 19 adapted to depress a contact finger 20 against a finger 21, which finger 21 may be adjusted by a screw 22. The finger 20 is connected by a wire 23 with the contact arm 16. The contact arm 17 is connected by a wire 24 through the solenoid 14 with one of the lines of a source of supply, and the contact finger 21 is connected by a wire 25 with the other line of supply. In use, a suitable receptacle is placed upon the pan 5 and the required counterweight upon the pan 6. The slide 10 is then moved inwardly so as to bring the opening 11 in line with the throat of the hopper so that the contents of the hopper may pass into the receptacle on the pan 5. The inward movement of the slide forces the armature outward so as to close the contact between the arms 16 and 17. When the predetermined amount of material is discharged onto pan 5, that pan will be depressed so as to bring the contacts 20 and 21 together, thus closing the circuit through the magnet 14, energizing that magnet and drawing the armature inward, thus forcing the slide outward so as to close the throat of the hopper and at the same time again breaking the circuit.

We claim:

1. The combination with a scale including a pan, a hopper supported above said pan, a slide adapted to open and close the throat of said hopper, said slide provided at its end with an armature, a solenoid magnet coacting with said armature, contact arms adapted to be forced together by said armature, an arm connected with said scale pan, contacts adapted to be brought together by said arm, and electric connections whereby, when the pan is depressed, the magnet will be energized and the armature withdrawn.

2. A scale including a weighing pan, a hopper supported above said pan, a slide adapted to open and close the throat of said hopper, an armature connected with the inner end of said slide, a solenoid magnet coacting with said armature, the outer end of the said armature tapered, contact arms adapted to be forced together by said armature, an arm connected with the scale pan, contact fingers adapted to be forced together by the downward movement of said arm, whereby electric circuit may be closed through said magnet, and means for adjusting one of said fingers.

In testimony whereof, we have signed this specification in the presence of two subscribing witnesses.

LOUIS J. CURRAN.
GEORGE F. DONNELLY.

Witnesses:
ESTHER D. WILLIAMS,
HAROLD R. MAGOWAN.